(12) United States Patent
Chao

(10) Patent No.: US 6,375,872 B1
(45) Date of Patent: Apr. 23, 2002

(54) MICROENCAPSULATED ADHESIVE

(75) Inventor: Hung Ya Chao, Plainsboro, NJ (US)

(73) Assignee: Moore Business Forms, Grand Island, NY (US)

( * ) Notice: Subject to any disclaimer, the term of this patent is extended or adjusted under 35 U.S.C. 154(b) by 0 days.

(21) Appl. No.: 07/977,834

(22) Filed: Nov. 17, 1992

(51) Int. Cl.[7] .................... B01J 13/16; B01J 13/20; C09J 133/08

(52) U.S. Cl. .................... 264/4.33; 264/4.1; 264/4.3; 264/4.7; 411/258; 428/402.2; 428/402.21; 428/402.22; 428/402.24; 523/176

(58) Field of Search .................... 264/4.1, 4.3, 4.33, 264/4.7; 428/402.2, 402.24, 402.21, 402.22; 523/176; 411/258

(56) References Cited

U.S. PATENT DOCUMENTS

| | | | |
|---|---|---|---|
| RE24,899 E | | 7/1957 | Green |
| 2,800,457 A | | 7/1957 | Green et al. |
| 2,800,458 A | | 7/1957 | Green .................... 428/402.2 |
| 2,969,330 A | | 1/1961 | Brynko .................... 428/402.22 |
| 2,969,331 A | * | 1/1961 | Brynko et al. .............. 264/4.32 |
| 2,986,477 A | | 5/1961 | Eichel ................. 428/321.5 X |
| 3,016,308 A | | 1/1962 | Macaulay ............. 428/402.2 X |
| 3,317,433 A | | 5/1967 | Eichel ................... 428/402.21 |
| 3,415,758 A | | 12/1968 | Powell et al. ......... 428/402.2 X |
| 3,429,827 A | * | 2/1969 | Ruus ......................... 264/4.7 |
| 3,432,327 A | | 3/1969 | Kan et al. ............. 428/402.2 X |
| 3,516,943 A | | 6/1970 | Brynko et al. ........ 428/402.2 X |
| 3,657,379 A | | 4/1972 | Hilbelink et al. .............. 525/28 |
| 3,663,269 A | | 5/1972 | Fischer et al. ............... 428/346 |
| 3,691,090 A | | 9/1972 | Kitajima et al. .......... 264/4.6 X |
| 3,704,264 A | * | 11/1972 | Gorman ................. 428/402.22 |
| 3,725,501 A | | 4/1973 | Hilbelink et al. .............. 525/28 |
| 3,737,337 A | | 6/1973 | Schnoring et al. ... 428/402.2 X |
| 3,791,980 A | | 2/1974 | Goldsmith ......... 428/402.22 X |
| 3,814,156 A | | 6/1974 | Bachmann et al. .......... 411/258 |
| 3,825,640 A | | 7/1974 | Maierson ..................... 264/87 |
| 3,891,570 A | | 6/1975 | Fukushima et al. .. 428/402.2 X |
| 4,001,480 A | | 1/1977 | Shank ............... 428/402.24 X |
| 4,066,568 A | | 1/1978 | Nakazawa et al. ....... 264/4.1 X |
| 4,076,774 A | | 2/1978 | Short ..................... 264/4.3 X |
| 4,080,238 A | * | 3/1978 | Wolinski et al. ..... 428/321.5 X |
| 4,098,736 A | | 7/1978 | Li et al. ................... 264/4.1 X |
| 4,120,913 A | | 10/1978 | Petrie .......................... 525/524 |
| 4,228,216 A | * | 10/1980 | Austin et al. ............. 264/4.7 X |
| 4,254,201 A | | 3/1981 | Sawai et al. ........ 428/402.22 X |
| 4,272,398 A | | 6/1981 | Jaffe ................. 428/402.24 X |
| 4,273,827 A | | 6/1981 | Sweeney et al. .......... 411/82 X |
| 4,389,330 A | | 6/1983 | Tice et al. ............... 264/4.3 X |
| 4,425,065 A | | 1/1984 | Sweeney ..................... 411/23 |
| 4,439,581 A | * | 3/1984 | Irii et al. ..................... 524/839 |
| 4,442,267 A | * | 4/1984 | Charnock ............... 523/176 X |
| 4,497,916 A | | 2/1985 | Cooke et al. ................ 523/176 |
| 4,517,141 A | * | 5/1985 | Dahm et al. ................. 264/4.7 |
| 4,536,524 A | * | 8/1985 | Hart et al. ................... 523/176 |
| 4,555,206 A | | 11/1985 | Sweeney ..................... 411/23 |
| 4,588,639 A | * | 5/1986 | Ozono .................... 428/402.22 |
| 4,681,806 A | | 7/1987 | Matkan et al. ......... 428/402.21 |
| 4,693,652 A | | 9/1987 | Sweeney ..................... 411/23 |
| 4,830,558 A | | 5/1989 | Sweeney ..................... 411/258 |
| 4,861,627 A | | 8/1989 | Mathiowitz et al. ... 427/213.31 |
| 4,994,322 A | | 2/1991 | Delgado et al. ............. 428/343 |
| 5,000,636 A | * | 3/1991 | Wallace ....................... 411/258 |
| 5,043,314 A | | 8/1991 | Suzuki et al. ................ 503/214 |

FOREIGN PATENT DOCUMENTS

| | | |
|---|---|---|
| GB | 1411475 | 10/1975 |
| JP | 01-065131 | 3/1989 |
| JP | 2-102280 | 4/1990 |
| JP | 02-102280 | 4/1990 |
| JP | 50-151229 | 12/1990 |
| WO | WO 93/01421 | 1/1993 |

* cited by examiner

Primary Examiner—Richard D. Lovering
(74) Attorney, Agent, or Firm—Finnegan, Henderson, Farabow, Garrett & Dunner, L.L.P.

(57) ABSTRACT

A microencapsulated adhesive and a method for producing that microencapsulated adhesive is disclosed. The adhesive is produced from an alkyl acrylate or methacrylate monomer having about 4 to about 12 carbon atoms, or a mixture thereof. The monomer is encapsulated by interfacial polymerization, gelatin/gum arabic coacervation or melamine/formaldehyde encapsulation. The microcapsules may be polyamide or polyurea. The monomer is polymerized in the microcapsules by heating to form an adhesive that is non-tacky, but becomes tacky upon application of external forces, such as shearing. The microencapsulated adhesive composition may be used, among other applications, as an adhesive for stamps or envelopes.

14 Claims, No Drawings

MICROENCAPSULATED ADHESIVE

BACKGROUND OF THE INVENTION

The present invention relates to microencapsulated adhesives and processes for producing such microencapsulated adhesives. More particularly, the invention relates to a process for microencapsulating acrylate-based or methacrylate-based adhesives to produce an adhesive composition that is initially non-tacky but exhibits tacky properties upon application of external forces, such as shearing.

Adhesive compositions are generally tacky and gluey. However, there are numerous applications where it would be beneficial to mask the tacky nature of the adhesive prior to its use. Examples of such applications include adhesive materials for stamps or envelopes.

One potential way of rendering adhesives non-tacky is to microencapsulate the adhesive. Various attempts have been made to encapsulate adhesives such as hot melt ethylene/vinyl acetate copolymers and styrene/isoprene/styrene-type block copolymers. However, due to their high molecular weight and high viscosity, these copolymers tend to be solids at room temperature and precipitate when emulsified, and thus are very difficult to microencapsulate.

It is an object of the present invention to produce an adhesive composition that is initially non-tacky but can be made tacky when desired.

Another object of the present invention is to provide an adhesive compound that can be microencapsulated.

A further object of the present invention is to provide a monomer compound that is capable of being microencapsulated and is also capable of being polymerized inside the microcapsules to form a polymer adhesive.

The present inventor has found that acrylate or methacrylate monomers can be microencapsulated by well-known microencapsulation techniques, and then these monomers can be polymerized inside the microcapsules to form adhesives. These microencapsulated adhesives are initially non-tacky, but when external forces such as shearing are applied, the capsules break and the tacky adhesive is exposed.

SUMMARY OF THE INVENTION

To achieve the objects and in accordance with the purpose of the invention, as embodied and broadly described herein, the invention comprises a method of producing a microencapsulated adhesive by providing a mixture containing as a major component, an alkyl acrylate or alkyl methacrylate monomer, or a mixture thereof, along with a free radical initiator. This mixture of monomer and initiator is microencapsulated. The microencapsulated monomer and initiator is heated for a time and a temperature sufficient to cause the monomer to polymerize inside the microcapsules.

In another aspect of the present invention, there is provided a microencapsulated adhesive composition containing an adhesive produced from a monomer including as a major component an alkyl acrylate or methacrylate, or a mixture thereof, encapsulated in microcapsules. This composition functions as an adhesive that is initially non-tacky but exhibits tacky properties upon application of external forces, such as shearing. Specifically, upon application of an external force, such as shearing, at least some of the microcapsules are broken and the adhesive is exposed.

In a further aspect of the present invention, there is provided a microencapsulated adhesive composition produced by microencapsulating a mixture containing as a major component, an alkyl acrylate or methacrylate monomer having about 4 to about 12 carbon atoms, or a mixture thereof, along with a free radical initiator. The microencapsulated monomer and initiator are heated for a time and at a temperature sufficient to cause the monomer to polymerize inside the microcapsules. The adhesive that is formed is initially non-tacky but exhibits tacky properties upon the application of external forces, such as shearing.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

DETAILED DESCRIPTION OF THE INVENTION

In accordance with the present invention, microencapsulated adhesives are produced from monomers having as a major component an alkyl acrylate or methacrylate monomer, or a mixture thereof. The acrylate or methacrylate monomers used as a major component of the adhesives of the invention generally have very low viscosity and thus are capable of being encapsulated. Preferably, the monomer of the invention is a $C_4$–$C_{12}$ alkyl acrylate or methacrylate. It is to be understood, however, that any acrylate-based or methacrylate-based monomer that is capable of being polymerized inside microcapsules and is useful as an adhesive is within the scope of the present invention. In addition, other monomers such as vinyl acetate, styrene, acrylonitrile, methacrylonitrile, and the like can be present in the invention as a minor component. Following encapsulation, the monomers can be polymerized in the microcapsules by heating.

Examples of the acrylate and methacrylate monomers that can be used as the major component in accordance with the invention include, but are not limited to: isobutyl acrylate, isobutyl methacrylate, isodecyl acrylate, isodecyl methacrylate, isooctyl acrylate, 2-ethyl hexyl acrylate, isobornyl acrylate, 4-methyl-2-pentyl acrylate, 2-methyl butyl acrylate, isoamyl acrylate, isononyl acrylate and the like. Preferred monomers are isodecyl methacrylate and a mixture of ethyl hexyl acrylate and isobornyl acrylate.

In accordance with the invention, the monomers may be polymerized in the microcapsule by heating to a temperature sufficient to cause a reaction exotherm to be observed. After the reaction exotherm is reached, the microcapsule solution is preferably further heated to a temperature of about 5 degrees greater than the exotherm temperature for a period preferably ranging from about 4 to about 6 hours to complete the free radical polymerization.

In accordance with the invention, the adhesive can be microencapsulated by those techniques known in the art, including interfacial polymerization, gelatin/gum arabic coacervation and melamine/formaldehyde encapsulation. A preferred encapsulation technique is interfacial polymerization. The walls of the microcapsules are preferably comprised of polyamide or polyurea.

The interfacial polymerization method that may be used in accordance with the invention involves mixing the adhesive monomer or monomers to be microencapsulated together with a free radical initiator and either an acid chloride or an isocyanate. The resultant mixture is emulsified in an emulsification agent to obtain an oil-in-water emulsion. A polyfunctional amino compound is then added into the emulsion, whereby microcapsule walls are formed around each microparticle of oil. In accordance with the invention, when an acid chloride is mixed with the monomer and initiator, a polyamide microcapsule is produced—when an isocyanate is mixed with the monomer and initiator, polyurea capsules are formed. After the monomer or monomers and initiator are microencapsulated, the entire composition is heated to thermally polymerize the monomer or monomers inside the microcapsules.

The gelatin/gum arabic coacervation encapsulation method that may be used in accordance with the present invention involves first emulsifying the core material into a gelatin solution to obtain an oil-in-water emulsion. The emulsion is mixed with a gum arabic solution. The system is then pH adjusted or diluted to cause the gelatin/gum arabic to coacervate. Thereafter, the capsules are post-treated with a crosslinking agent, such as formaldehyde, glutaldehyde, or other similar known compounds.

The melamine-formaldehyde encapsulation method that may be used in accordance with the present invention involves first emulsifying the core material into a carboxyl methyl cellulose solution or a poly(styrene-maleic anhydride) solution to obtain an oil-in-water emulsion. The emulsion is then mixed with a melamine-formaldehyde precondensate solution. The system is then pH adjusted, followed by heating to initiate polymerization of the precondensate to a high molecular weight compound. The presence of the carboxyl methyl cellulose or poly(styrene-maleic anhydride) solution helps the polymerized melamine-formaldehyde to deposit onto the core material surfaces, thereby encapsulating the core.

The free radical initiator that can be used in accordance with the invention is any oil-soluble, thermal activatable free radical initiator known in the art. Examples of such free radical initiators include, but are not limited to: benzoyl peroxide, t-amyl peroxyneodecanoate, t-amyl peroxypivalate, t-amyl peroxy-2-ethyl-hexanoate, t-butyl peroxyisobutyrate, t-amyl perbenzoate, di-t-butyl peroxide, 2,2'-azobis(2-methylbutyronitrile), 2,2'-azobis(2,4-dimethylvaleronitrile), 2,2'-azobis(2-methylpropanenitrile), and the like. A preferred initiator for use in the invention is benzoyl peroxide.

Acid chlorides that can be used in the invention to produce polyamide microcapsules include, but are not limited to: terephthaloyl chloride, isophthaloyl chloride, 1,3,5-benzenetricarboxylic acid chloride, sebacyl dichloride, 4,4-sulfonyldibenzoyl chloride, 1,3-benzenedisulfonyl chloride, 1,4-benzenedisulfonyl chloride, or mixtures thereof. A preferred acid chloride for use in the invention is a mixture of isophthaloyl chloride and terephthaloyl chloride.

Isocyanate compounds that can be used in the invention to produce polyurea microcapsules include, but are not limited to: 2,4- and 2,6-diisocyanatotoluene, 4,4'-diisocyanato-diphenyl methane, 1,3,5-trimethylbenzene-2,4-diisocyanate, 1,6-diisocyanato-hexane, polymethylene polyphenyl isocyanate, polyisocyanates which additionally contain biuret-, allophanate-, and carbodiimide groups, and the like. A preferred isocyanate for use in the invention is Desmodur N-100, a polyfunctional aliphatic isocyanate compound containing a biuret linkage commercially available from Mobay Chemicals.

Examples of polyfunctional amines that can be used in the invention include, but are not limited to: ethylene diamine, diethylene triamine, triethylene tetramine, tetraethylene pentamine 1,6 hexanediamine, polyethyleneimine, bis-hexamethylenetriamine, and the like. A preferred polyfunctional amine for use in the invention is diethylene triamine.

The emulsification agents that can be used in accordance with the invention include those compounds that contain both hydrophilic and hydrophobic groups in the same molecule. Examples include, but are not limited to: partially hydrolyzed polyvinyl alcohol, starch derivatives, cellulose derivatives, polyacrylamide, and the like. A preferred emulsification agent for use in the invention is partially hydrolyzed polyvinyl alcohol.

The following examples are illustrative of the invention embodied herein and are not to be considered limiting.

EXAMPLE 1

60 parts of ethyl hexyl acrylate/isobornyl acrylate (at a 7/3 ratio by weight) and 0.13 parts of benzoyl peroxide were mixed with 2.39 parts of isophthaloyl chloride/1.02 parts of terephthaloyl chloride. The resultant mixture was emulsified into 110 parts of 2% Vinol 523 solution in a Waring blender. Vinol 523 is a partially hydrolyzed polyvinyl alcohol, commercially available from Air Products and Chemicals. To this emulsion, 20 parts of an aqueous solution containing 1.38 parts of diethylenetriamine, 0.54 part of NaOH, and 0.71 part of sodium carbonate was added. The mixture was stirred at room temperature, under mild agitation, for 16 hours to complete the microencapsulation reaction. Particle size varied from about 5 to about 120 microns, with an average of about 40 microns.

The content was then heated to about 85° C., when a reaction exotherm was observed. After the reaction exotherm, the mixture was further heated to 90° C. for about 5 hours to complete the free radical polymerization.

EXAMPLE 2

60 parts of isodecyl methacrylate and 0.12 parts of benzoyl peroxide were mixed with 2.39 parts of isophthaloyl chloride/1.02 parts of terephthaloyl chloride. The resultant mixture was emulsified into 110 parts of 2% Vinol 523 solution in a Waring blender. To this emulsion, 20 parts of an aqueous solution containing 1.38 parts of diethylenetriamine, 0.54 part of NaOH, and 0.71 part of sodium carbonate was added. The mixture was stirred at room temperature, under mild agitation, for 16 hours to complete the microencapsulation reaction. Particle size varied from about 5 to about 140 microns, with an average of about 45 microns.

The content was heated to about 85° C., when a reaction exotherm was observed. After the reaction exotherm, the mixture was further heated to 90° C. for about 5 hours to complete the free radical polymerization.

EXAMPLE 3

60 parts of ethyl hexyl acrylate/isobornyl acrylate (at a 7/3 weight ratio) and 0.12 parts of benzoyl peroxide were mixed with 5.65 parts of Desmodur N-100. Desmodur N-100 is a polyfunctional aliphatic isocyanate compound containing a biuret linkage, commercially available from Mobay Chemicals. The resultant mixture was emulsified into 110 parts of 2% Vinol 523 solution in a Waring blender. To this emulsion, 20 parts of an aqueous solution containing 1.02 parts of diethylenetriamine was added. The mixture was stirred at 60° C. under mild agitation for 2 hours to complete the microencapsulation reaction. Particle size varied from about 5 to about 150 microns, with an average of about 48 microns.

The content was heated to about 85° C., when a reaction exotherm was observed. After the reaction exotherm, the mixture was further heated to 90° C. for 5 hours to complete the free radical polymerization.

EXAMPLE 4

60 parts of isodecyl methacrylate and 0.12 parts of benzoyl peroxide were mixed with 5.65 parts of Desmodur N-100. The resultant mixture was emulsified into 110 parts of a 2% Vinol 523 solution in a Waring blender. To this emulsion, 20 parts of an aqueous solution containing 1.02 parts of diethylenetriamine was added. The mixture was stirred at 60° C. under mild agitation for 2 hours to complete the microencapsulation reaction. Particle size varied from about 5 to about 145 microns, with an average of about 45 microns.

The content was then heated to about 85° C., when a reaction exotherm was observed. After the reaction exotherm, the mixture was further heated to 90° C. for 5 hours to complete the free radical polymerization.

EXAMPLE 5

60 parts of ethyl hexyl acrylate/isobornyl acrylate (at a 7/3 weight ratio) and 0.12 parts of benzoyl peroxide were mixed with 5.65 parts of Desmodur N-100. The resultant mixture was emulsified into 110 parts of a 1% Vinol 523 solution in a Waring blender. To this emulsion, 20 parts of an aqueous solution containing 1.02 parts of diethylenetriamine was added. The mixture was stirred at 60° C. under mild agitation for 2 hours to complete the microencapsulation reaction. Particle size varied from about 5 to about 135 microns, with an average of about 40 microns.

The content was then heated to about 85° C., when a reaction exotherm was observed. After the reaction exotherm, the mixture was further heated to 90° C. for 5 hours to complete the free radical polymerization.

EXAMPLE 6

60 parts of isodecyl methacrylate and 0.12 parts of benzoyl peroxide were mixed with 5.65 parts of Desmodur N-100. The resultant mixture was emulsified into 110 parts of a 1% Vinol 523 solution in a Waring blender. To this emulsion, 20 parts of an aqueous solution containing 1.02 parts of diethylenetriamine was added. The mixture was stirred at 60° C. under mild agitation for 2 hours to complete the microencapsulation reaction. Particle size varied from about 5 to about 145 microns, with an average of about 40 microns.

The content was then heated to about 85° C., when a reaction exotherm was observed. After the reaction exotherm, the mixture was further heated to 90° C. for 5 hours to complete the free radical polymerization.

Each of the microcapsule compositions in Examples 1–6 was coated onto a 24# bond paper substrate, at a coating weight of about 5 g/m2 and dried in a heated oven at 90° C. for 1 minute. The coatings were completely non-tacky, yet under some shearing pressure, the tacky properties of the adhesive were obtained.

Other embodiments of the invention will be apparent to those skilled in the art from consideration of the specification and the practice of the invention disclosed herein. It is intended that the specification and examples be considered as exemplary only with a true scope and spirit of the invention being indicated by the following claims.

What is claimed is:

1. A method of producing a microencapsulated adhesive comprising:

providing a mixture containing as a major component an alkyl acrylate or methacrylate monomer, or a mixture thereof, and a free radical initiator;

microencapsulating said mixture of monomer and initiator;

heating said microencapsulated monomer and initiator for a time and at a temperature sufficient to cause said monomer to polymerize inside said microcapsules.

2. The method of claim 1, wherein said alkyl group has about 4 to about 12 carbons.

3. The method of claim 2, wherein said monomer is selected from the group consisting of isobutyl acrylate, isobutyl methacrylate, isodecyl acrylate, isodecyl methacrylate, isooctyl acrylate, 2-ethyl hexyl acrylate, isobornyl acrylate, 4-methyl-2-pentyl acrylate, 2-methyl butyl acrylate, isoamyl acrylate, isononyl acrylate, and mixtures thereof.

4. The method of claim 3, wherein said monomer is selected from the group consisting of isodecyl methacrylate and mixtures of 2-ethyl hexyl acrylate and isobornyl acrylate.

5. The method of claim 1, wherein said free radical initiator is benzoyl peroxide.

6. The method of claim 1, wherein said heating step comprises heating said microencapsulated monomer and initiator to a temperature at which a reaction exotherm is observed, followed by increasing the temperature by about 5° C. and heating for a period ranging from about 4 to about 6 hours.

7. The method of claim 1, wherein said microencapsulation step comprises:

mixing an acid chloride with said mixture of monomer and initiator;

emulsifying the resulting mixture in an emulsifying agent to obtain an oil-in-water emulsion of microparticles; and adding a polyfunctional amino compound to said emulsion to form polyamide walls around said microparticles.

8. The method of claim 7, wherein said emulsifying agent is partially hydrolyzed polyvinyl alcohol.

9. The method of claim 7, wherein said acid chloride is a mixture of isophthaloyl chloride and terephthaloyl chloride.

10. The method of claim 7, wherein said polyfunctional amino compound is diethylenetriamine.

11. The method of claim 1, wherein said microencapsulation step comprises:

mixing an isocyanate with said mixture of monomer and initiator;

emulsifying the resulting mixture in an emulsifying agent to obtain an oil-in-water emulsion of microparticles; and adding a polyfunctional amino compound to said emulsion to form polyurea walls around said microparticles.

12. The method of claim 11, wherein said emulsifying agent is partially hydrolyzed polyvinyl alcohol.

13. The method of claim 11, wherein said isocyanate compound is a polyfunctional aliphatic isocyanate containing a biuret linkage.

14. The method of claim 11, wherein said polyfunctional amino compound is diethylenetriamine.

* * * * *

(12) EX PARTE REEXAMINATION CERTIFICATE (4915th)
United States Patent
Chao

(10) Number: US 6,375,872 C1
(45) Certificate Issued: Mar. 2, 2004

(54) MICROENCAPSULATED ADHESIVE

(75) Inventor: Hung Ya Chao, Plainsboro, NJ (US)

(73) Assignee: Moore Business Forms, Grand Island, NY (US)

Reexamination Request:
No. 90/006,378, Sep. 6, 2002

Reexamination Certificate for:
Patent No.: 6,375,872
Issued: Apr. 23, 2002
Appl. No.: 07/977,834
Filed: Nov. 17, 1992

(51) Int. Cl.$^7$ .................. B01J 13/16; B01J 13/20; C09J 133/08
(52) U.S. Cl. .................. 264/4.33; 264/4.1; 264/4.3; 264/4.7; 411/258; 428/402.2; 428/202.21; 428/204.22; 428/402.24; 523/176
(58) Field of Search .................. 264/4.1, 4.3, 4.33, 264/4.7; 428/402.2, 402.21, 402, 402.24; 523/176; 411/258

(56) References Cited

U.S. PATENT DOCUMENTS

| 3,429,827 A | 2/1969 | Ruus | 264/4.7 |
| 3,516,941 A | 6/1970 | Matson | 264/4.33 |
| 4,994,322 A * | 2/1991 | Delgado et al. | 428/402 |
| 6,375,872 B1 | 4/2002 | Chao | 264/4.33 |

FOREIGN PATENT DOCUMENTS

| JP | 02 102280 | * | 4/1990 |

OTHER PUBLICATIONS

Hawley's Condensed Chemical Dictionary, Eleventh Edition, edited by Sax and Lewis, Sr. (Van Nostrand Reinhold Company, Ney York, NY, copyright 1987), Oct. 1989, p. 224–225, 460–461, 945 and 1235.*

PTO: 2003–3203, English Langauge Translation of JP 02 102280, Apr. 1990, U.S. Patent and Trademark Office (May 5, 2003), pp. 1–12.*

Morrison and Boyd, 3rd Edition, "Organic Chemistry", Chapter 15 "Alcohols I. Preparation and Physical Properties", Allyn and Bacon Inc., Boston, publishers, 1974, Month unavailable, p. 498.

* cited by examiner

*Primary Examiner*—Daniel S. Metzmaier

(57) ABSTRACT

A microencapsulated adhesive and a method for producing that microencapsulated adhesive is disclosed. The adhesive is produced from an alkyl acrylate or methacrylate monomer having about 4 to about 12 carbon atoms, or a mixture thereof. The monomer is encapsulated by interfacial polymerization, gelatin/gum arabic coacervation or melamine/formaldehyde encapsulation. The microcapsules may be polyamide or polyurea. The monomer is polymerized in the microcapsules by heating to form an adhesive that is non-tacky, but becomes tacky upon application of external forces, such as shearing. The microencapsulated adhesive composition may be used, among other applications, as an adhesive for stamps or envelopes.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *